(12) United States Patent
Finkelstein et al.

(10) Patent No.: US 6,940,805 B2
(45) Date of Patent: Sep. 6, 2005

(54) METHODS AND APPARATUS FOR CROSS-TALK AND JITTER REDUCTION IN MULTI-BEAM OPTICAL DISKS

(75) Inventors: Koby Finkelstein, Kafar Saba (IL);
Steven R. Rogers, Emek Sorek (IL);
Tatiana Tania Kosoburd, Lod (IL);
Joseph Kedmi, Jerusalem (IL)

(73) Assignee: Dragsholm Wireless Holdings LLC, Las Vegas, NV (US)

( * ) Notice: Subject to any disclaimer, the term of this patent is extended or adjusted under 35 U.S.C. 154(b) by 594 days.

(21) Appl. No.: 10/045,208

(22) Filed: Oct. 23, 2001

(65) Prior Publication Data

US 2003/0076760 A1 Apr. 24, 2003

(51) Int. Cl.$^7$ .................................................. G11B 7/00
(52) U.S. Cl. ..................................... 369/124; 369/44.37
(58) Field of Search .................... 369/124.02, 124.03, 369/124.11, 124.12, 44.32, 44.37, 44.41, 44.42, 44.29, 44.35, 53.35

(56) References Cited

U.S. PATENT DOCUMENTS

| | | | |
|---|---|---|---|
| 4,325,135 A | 4/1982 | Dil et al. | |
| 5,081,617 A | 1/1992 | Gelbart | |
| 5,128,919 A | 7/1992 | Narahara et al. | |
| 5,153,872 A | 10/1992 | Maeda | |
| 5,181,161 A | 1/1993 | Hirose et al. | |
| 5,210,730 A | 5/1993 | Hayashi et al. | |
| 5,226,031 A | 7/1993 | Abe | |
| 5,347,506 A | 9/1994 | Matsudo et al. | |
| 5,392,268 A | 2/1995 | Rokutan | |
| 5,400,312 A | 3/1995 | Haraguchi | |
| 5,420,847 A | 5/1995 | Maeda et al. | |
| 5,426,623 A | 6/1995 | Alon et al. | |
| 5,459,619 A | 10/1995 | Colineau et al. | |
| 5,483,511 A | 1/1996 | Jewell et al. | |
| 5,483,515 A | 1/1996 | Cheng et al. | |
| 5,485,438 A | 1/1996 | Koyama | |
| 5,493,553 A | 2/1996 | Maurice et al. | |
| 5,526,182 A | 6/1996 | Jewell et al. | |
| 5,544,141 A | 8/1996 | Kawasaki | |
| 5,619,487 A | 4/1997 | Tanabe et al. | |
| 5,627,805 A | 5/1997 | Finkelstein et al. | |
| 5,642,341 A | 6/1997 | Stork | |
| 5,701,283 A | 12/1997 | Alon et al. | |
| 5,729,512 A | * 3/1998 | Alon | 369/44.41 |
| 5,729,514 A | 3/1998 | Horigome et al. | |
| 5,907,526 A | 5/1999 | Alon et al. | |
| 5,959,953 A | * 9/1999 | Alon | 369/124.02 |
| 6,333,906 B1 | * 12/2001 | Yanagisawa et al. | 369/103 |
| 6,388,966 B2 | * 5/2002 | Sato et al. | 369/47.16 |
| 6,442,114 B1 | * 8/2002 | Ishibashi et al. | 369/124.03 |
| 6,674,695 B1 | * 1/2004 | Miyanabe et al. | 369/44.32 |

FOREIGN PATENT DOCUMENTS

| | | |
|---|---|---|
| JP | 62-60731 | 12/1987 |
| JP | 4-10141 | 2/1992 |
| JP | 7-92924 | 10/1995 |

* cited by examiner

*Primary Examiner*—Thang V. Tran
(74) *Attorney, Agent, or Firm*—Townsend and Townsend and Crew LLP

(57) ABSTRACT

Methods and apparatus are provided for reducing cross-talk and jitter caused by track offsets in multi-beam optical disks. The method and apparatus involve using split detectors and cross-talk cancellation algorithms in the multi-element photodetector of the multi-beam optical disks. The cross-talk cancellation algorithms are applied according to the value of the track offset as a function of the track pitch.

39 Claims, 9 Drawing Sheets

Disk in focus

Disk close to objective lens

Disk far from objective lens

Disk in focus

Disk close to objective lens

Disk far from objective lens

48

| Track Offset (% of track pitch) | No split detectors, no cross-talk cancellation | Split detectors, no cross-talk cancellation | No split detectors, with cross-talk cancellation | Split detectors with cross-talk cancellation |
|---|---|---|---|---|
| 0 | 6.2 | 6.8 | 6.2 | 5.4 |
| 7 | 6.7 | 6.4 | 6.1 | 5.2 |
| 14 | 9.9 | 6.6 | 6.6 | 5.3 |
| 21 | 16.5 | 6.25 | 7.8 | 5.4 |
| 29 | 23.9 | 5.9 | 12.5 | 5.9 |

| Track Offset (% of track pitch) | Coefficient C1 (cross-talk cancellation algorithm 1) | Coefficient C2 (cross-talk cancellation algorithm 2) |
|---|---|---|
| 0 | -0.45 | -1 |
| 7 | -0.32 | -0.47 |
| 14 | -0.21 | -0.25 |
| 21 | -0.1 | -0.12 |
| 29 | 0.005 | -0.005 |
| 36 | 0.1 | 0.1 |
| 43 | 0.26 | 0.21 |
| 50 | 0.4 | 0.29 |

| Track Offset (% of track pitch) | RMS Ratio (cross-talk cancellation algorithm 1) | RMS Ratio (cross-talk cancellation algorithm 2) |
|---|---|---|
| 0 | 0.99 | 1.99 |
| 7 | 0.95 | 1.41 |
| 14 | 0.95 | 1.19 |
| 21 | 0.97 | 1.08 |
| 29 | 1 | 1 |
| 36 | 1.06 | 0.95 |
| 43 | 1.15 | 0.91 |
| 50 | 1.22 | 0.87 |

FIG. 9

METHODS AND APPARATUS FOR CROSS-TALK AND JITTER REDUCTION IN MULTI-BEAM OPTICAL DISKS

FIELD OF THE INVENTION

The present invention relates generally to multi-beam optical disk drives which simultaneously read multiple tracks of an optical disk. More specifically, the present invention provides methods and apparatus for reducing cross-talk and jitter caused by track offsets in multi-beam optical disks.

BACKGROUND OF THE INVENTION

Due to their high storage density, long data retention life, and relatively low cost, optical disks have become the predominant media format for distributing information. The compact disk (CD) format was developed and marketed for the distribution of musical recordings and has replaced vinyl records. High-capacity, read-only data storage media, such as CD-ROM and DVD-ROM, have become prevalent in the personal computer field, and the DVD format may soon replace videotape as the distribution medium of choice for video information.

Relatively inexpensive optical disk writers and writable optical media are now available, making optical disks popular as backup and archival storage devices for personal computers. The large storage capacity of writable optical disks also makes them ideal for use in multimedia authoring and in other applications which require access to large amounts of storage. Current writable optical disk technologies include several write-once technologies, such as CD-Recordable (CD-R) and DVD-Recordable (DVD-R). A few technologies permit writing, erasing, and rewriting data on a disk, such as Mini-Disk (MD), CD-RW, DVD-RW, and DVD-RAM, which use magneto-optical phase-change or dye-polymer technologies. Recent advances in writable optical disk technology have made rewritable optical media more practical, and the specification for DVD-RAM calls for use of high-capacity rewritable optical media.

An optical disk is made of a transparent disk or substrate in which data, in the form of a serial bit-stream, are encoded as a series of pits in a reflective surface within the disk. The pits are arranged along a spiral or circular track. Data are read from the optical disk by focusing a low power laser beam onto a track on the disk and detecting the light reflected from the surface of the disk. By rotating the optical disk, the light reflected from the surface of the disk is modulated by the pattern of the pits rotating into and out of the field of laser illumination. Optical and imaging systems detect the modulated, reflected, laser light and produce an electrical signal that is decoded to recover the digital data stored on the optical disk. The recovered digital data, which may include error correcting codes and additional subcoded information, is further processed to recover the stored data.

To be able to retrieve data from anywhere on an optical disk, an optical system includes a pickup assembly which may be positioned to read data from any disk track. An example of an integrated optical disk assembly, wherein the laser source of illumination, focusing optics, and the detector that receives reflected illumination from the optical disk are contained within a single compact pickup assembly is described in U.S. Pat. No. 5,285,062. Processor-driven servo mechanisms are provided for focusing the optical system and for keeping the pickup assembly positioned over the track, despite disk warpage or eccentricity.

In most previously known systems the data is retrieved from the disk serially, i.e., one bit a time, so that the maximum data transfer rate for the optical disk reader is determined by the rate at which the pits pass by the pickup assembly. The linear density of the bits and the track pitch is fixed by the specification of the particular optical disk format. For example, CD disks employ a track pitch of 1.6 μm, while the DVD employs a track pitch only about one-half as wide.

Previously known methods of increasing the data transfer rate of optical disk readers have focused on increasing the rate at which the pits pass by the optical pickup assembly by increasing the rotational speed of the disk itself. Currently, drives with rotational speeds of up to 16×standard speed are commercially available, and even faster reading speeds have been achieved by moving to constant angular velocity designs. Higher disk rotational speeds, however, place increased demands on the optical and mechanical subsystems within the optical disk drive, create greater vibration, and may make such drivers more difficult and expensive to design and manufacture.

A cost effective alternative to increasing the disk rotational speed to provide faster optical disk readers is to read multiple data tracks simultaneously. Numerous methods for generating multiple beams to read several tracks simultaneously have been used. U.S. Pat. No. 5,144,616 to Yasukawa et al., for example, shows an array of laser diodes which may generate multiple beams for use in simultaneously reading multiple tracks of an optical disk. U.S. Pat. No. 4,459,690, to Corsover, uses acousto-optical techniques to split a beam into multiple beams for use in reading an optical disk. Other systems have used a diffraction grating to generate multiple beams used to simultaneously illuminate multiple tracks. The system described in commonly assigned U.S. Pat. No. 5,426,623 to Alon et al., uses a wide area illumination beam to simultaneously read multiple tracks of an optical disk.

Using a system which reads multiple tracks simultaneously may provide for dramatic increases in the speed of optical disk readers. For example, a drive which rotates the disk at only eight times the standard speed (i.e. an 8X drive), and reads seven tracks simultaneously, may provide reading speeds equivalently to a true 56X drive.

It should be noted that as used herein, a data track is a portion of the spiral data track of a typical optical disk, and follows the spiral for one rotation of the disk. Thus, a drive capable of reading multiple data tracks simultaneously will read multiple portions of the spiral data track at once. For optical disks having concentric circular tracks, a data track refers to one such circular track.

Commonly assigned U.S. Pat. No. 5,793,549 to Alon et al., describes an optical disk reader that reads multiple data tracks simultaneously, for example, using multiple laser beams. The multiple laser beams, which may be obtained by splitting a single beam using a diffraction grating or by providing multiple laser sources, are focused on and aligned with corresponding tracks of the optical disk. The reflected beams are then detected and decoded. Thus, a disk rotated at 6X the standard speed in a disk drive reading ten tracks at a time provides a data rate equivalent to a 60X single beam drive, but without the complications associated with high rotational speeds.

Implementation of simultaneous multiple track reading capability for optical disks presents new design challenges. If multiple beams are used, for example, the beams should be properly aligned with the tracks being read, and the beams reflected from the optical disk should be correctly aligned with the photodetector. For a multi-beam system, the photodetector is typically a multi-element detector such that each of the reading beams is aligned to focus on a track and projected onto one of the detector elements of the multi-element detector, as described in commonly assigned, copending U.S. patent application Ser. No. 09/464,359, filed Dec. 15, 1999.

In addition, manufacturing tolerances may lead to minor differences in the magnification of an optical pickup assembly, leading to minor differences in the spacing of the beams. There is also some variation in the track pitch allowed in the specification of most optical disk formats, such as the CD and the DVD formats. A multi-beam optical disk reader using such a format should be able to detect and correct for these magnification errors and track pitch variations to insure that the beams are correctly aligned with the tracks. When a beam is not aligned with its corresponding track, the distance between the center of the beam and the track it's supposed to focus on is referred to as a track offset. A track offset may occur due to variations in track pitch, grating angle adjustment, disk eccentricity, and sled position. In some instances, track offset can reach up half of the track pitch.

Such errors arising from magnification errors, track pitch variations, and large track offsets may result in cross-talk, which occurs when a portion of the light beam reflected from one track is being read by a photodetector associated with an adjacent track, and jitter, which occurs when the sampling of the digital signal read from a track is not done on time. The presence of cross-talk and jitter result in poor signals being read from the disk.

A previously known method for correcting for cross-talk resulting from magnification errors is described in commonly assigned U.S. Pat. No. 5,959,953 to Alon. The method involves special circuitry used in connection with a multi-beam optical pickup assembly to detect a magnification error, and to correct or compensate for the detected magnification error. One method of compensating for the detected magnification error is to perform cross-talk correction. The cross-talk correction uses additional circuitry designed to correct magnification errors or cross-talk. At present, there are no systems in place that can reduce both cross-talk and jitter without requiring additional circuitry connected to the multi-beam optical pickup assembly. In addition, the current systems are not able to reduce both cross-talk and jitter that occur due to large track offsets. The present invention is an improvement of the apparatus described above.

SUMMARY OF THE INVENTION

The present invention provides methods and apparatus for cross-talk and jitter reduction in multi-beam optical disk drives at the presence of large track offsets.

The present invention also provides methods and apparatus for cross-talk and jitter reduction in multi-beam optical disks that are able to reduce cross-talk and jitter without requiring additional circuitry connected to the multi-beam optical pickup assembly.

These and other objects of the present invention are accomplished by using split detectors and cross-talk cancellation algorithms in the multi-element photodetector of the multi-beam optical disks. In a preferred embodiment, each detector other than the central detector in the multi-element photodetector is split into two detector segments. The central detector may be split into four detector segments, for use as a quadrant detector, generating astigmatic focus error signals and tracking signals.

Advantageously, using the split detectors reduces cross-talk and jitter considerably when the track offset is not a large fraction of the track pitch. Cross-talk cancellation algorithms are used together with the split detectors to significantly reduce cross-talk and jitter when the track offset is a large fraction of the track pitch. Additionally, the cross-talk and jitter reduction is performed without requiring additional circuitry connected to the multi-optical pickup assembly.

BRIEF DESCRIPTION OF THE DRAWINGS

The foregoing and other advantages of the present invention will be apparent upon consideration of the following detailed description, taken in conjunction with the accompanying drawings, in which like reference characters refer to like parts throughout, and in which:

FIG. 7 is a table of percentages of jitter versus track offset determined by simulation;

FIG. 8 is a table of cross-talk cancellation coefficients versus track offset determined by simulation; and FIG. 9 is a table of RMS ratios versus track offset determined by simulation of two different cross-talk cancellation algorithms.

DETAILED DESCRIPTION OF THE INVENTION

Figure 1:
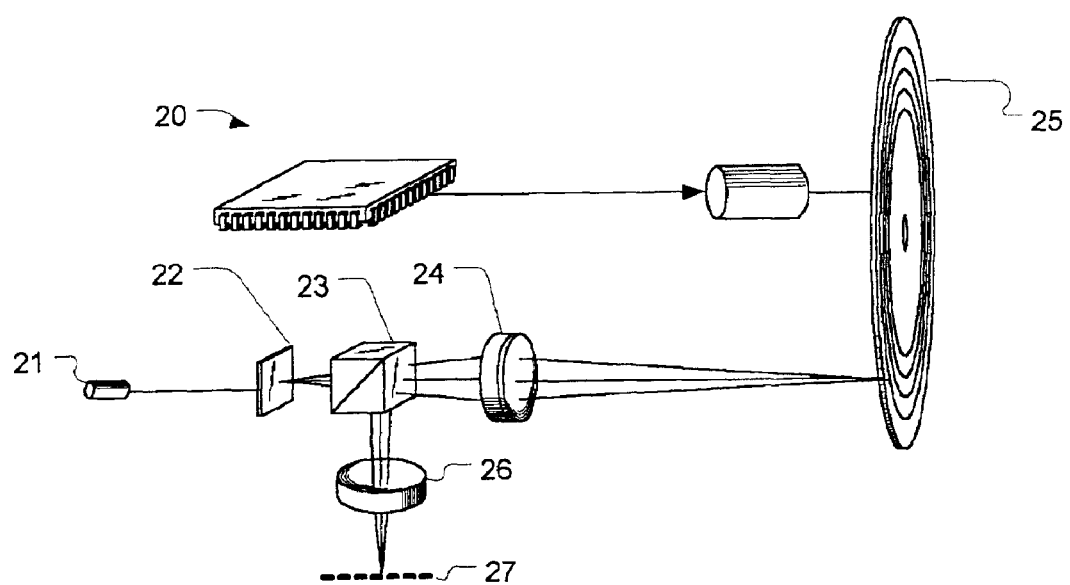
FIG. 1 is a schematic view of a simplified multi-beam optical pickup suitable for use in the present invention.

Referring to FIG. 1, a schematic view of a simplified multi-beam optical pickup suitable for use in the present invention is described. Optical pickup 20 may be used for reading optical disk 25, which may be, for example, either a CD format or a DVD format disk. Individual components of optical pickup assembly 20 may comprise elements used in previously known optical disk readers. Light from light source 21, typically a laser diode, is directed to grating 22 which splits the light into multiple beams. The multiple beams pass through beam splitter 23 and directed to optical disk 25. Objective lens 24 is adjusted by a servo mechanism to keep the light beams focused on the surface of optical disk 25.

Optical disk 25 contains a reflective layer in which the data is recorded. Typically the data is recorded in the form of pits (or bumps) in the reflective layer. Alternatively, some recordable optical disks use physical or chemical properties of the reflective layer material, such as its magnetic properties, or its ability to polarize incident light, to record the data.

The reading beams focused on optical disk 25 are reflected by the reflective layer and modulated by the data recorded therein. The reflected beams travel back through objective lens 24 and are then directed towards focus element 26 and multi-element photodetector 27 by beam splitter 23. Focus element 26 may be a holographic element that introduces astigmatism into at least a central reading beam, so that an astigmatic focus detector may be used. Alternatively, focus element 26 may comprise microlenses, a wedge lens, a dual knife edge, or holographic element for use with focus error detection. As will be described in greater detail herein below, if the focus error detection is not astigmatic, an alternative embodiment of multi-element detector 27 having detector elements appropriate for detecting the focus error should also be used.

Multi-element photodetector 27 provides electrical signals corresponding to the light beams impinging thereon. Processing circuitry, as described, for example, in commonly owned U.S. Pat. No. 5,627,805, decodes and processes the electrical signals to recover the data recorded on the optical disk. Additional circuitry converts the data to a format suitable for use by a computer or other processing device, and acts as an interface between the optical disk reader and computer or other processing device.

Diffraction grating 22 also may comprise a hologram, and fiber optic wave guides may be used to create a light source. The laser diode together with the grating can be replaced by the laser diode array. A collimating lens can be inserted into the system before or after beam splitter 23. If beam splitter 23 is after a collimating lens, it can be replaced by a half-silvered mirror. In addition, one or more of mirrors may be inserted by changing the physical arrangement of the optical components.

The multiple laser beams are used to simultaneously read multiple tracks of an optical disk. When projected onto an optical disk, the laser beam spots are arranged in a specific pattern, such as a line or array of spots, to ensure each of the reading beams is aligned to focus on a track and projected onto one of the detector elements of multi-element detector 27.

Figure 2A:
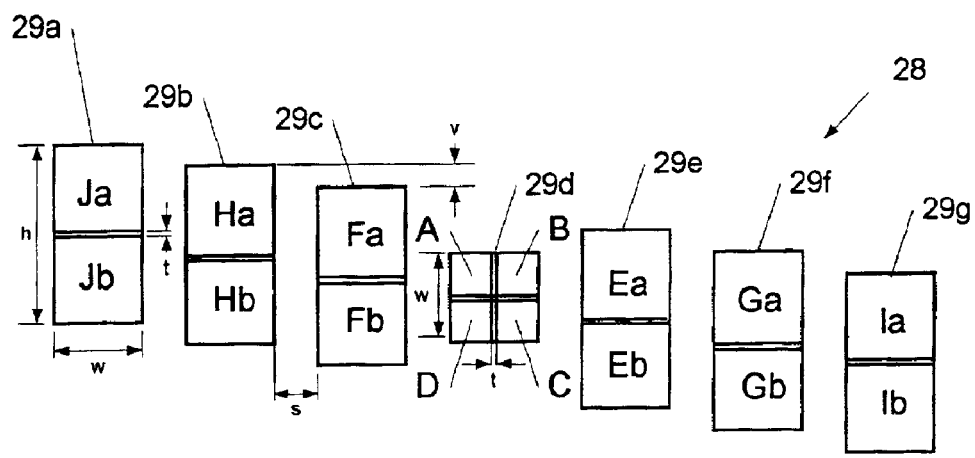
FIGS. 2A, 2B and 2C show alternative designs of two multi-element photodetectors constructed in accordance with the principles of the present invention.
Figure 2B:
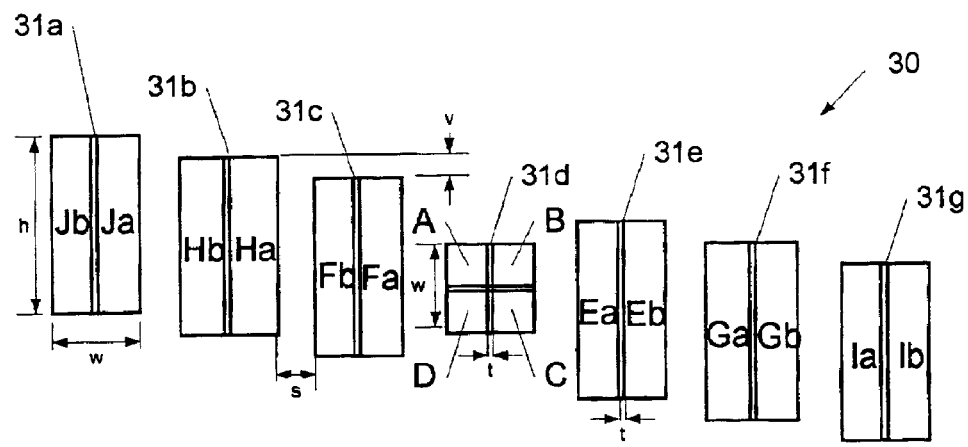
Figure 2C:
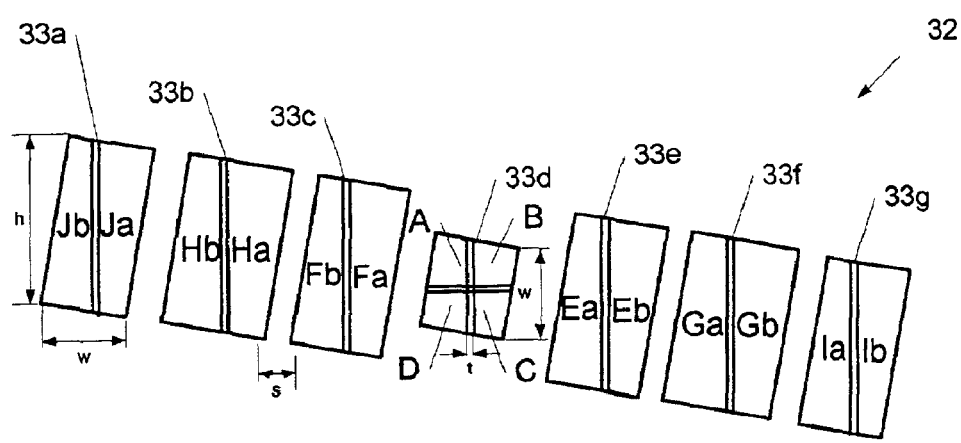

Referring now to FIGS. 2A, 2B and 2C schematic views of multi-element photodetectors having split detectors constructed in accordance with the principles of the present invention are described. Multi-element photodetector 28 in FIG. 2A comprises detector elements 29a–g, multi-element photodetector 30 in FIG. 2B comprises detector elements 31a–g, and multi-element photodetector 32 in FIG. 2C comprises detector elements 33a–g, each of which detects light reflected from a corresponding track of an optical disk. Each of elements 29a–c, 29e–g, 31a–c, 31e–g, 33a–c, 33e–g has an elongated shape with height h, and width w. Adjacent elements of multi-element detectors 28 and 30 are separated from each other by a predetermined spacing s, and are staggered relative to adjacent elements by a predetermined distance v. In a preferred embodiment, w is approximately 50 microns, h is approximately 120 microns, v is approximately 4.2 microns, and s is approximately 9.8 microns. It is to be understood, however, that these values depend upon the design of the optical pickup system.

As used herein, a staggered arrangement of detector elements is one in which a top or bottom edge of an element is differently positioned along an axis relative to the top or bottom edge of an adjacent element. Elements are offset from each other along an axis if their centers are differently positioned along that axis. Thus, detector elements 29a–g and detector elements 31a–g are both staggered, since their top and bottom edges have differing vertical positions, i.e., tangential along a track, and offset, since they are centered at varying vertical positions. It should be understood by one skilled in the art that the detector elements do not have to be staggered, as illustrated in FIG. 2C.

Elements 29d, 31d, and 33d the central elements of multi-element detector 28, 30, and 32, respectively, preferably have both height and width w, and preferably comprise a quadrant detector with four detector segments, A, B, C, and D. The segments are separated by a distance t, which is approximately 3 microns in a preferred embodiment. As is well-known in the art, signals generated by these segments may be used in astigmatic and double-knife edge focus error detection, and in tracking error detection. The central reading beam reflected from the disk is projected onto the center of elements 29d, 31d, or 33d.

Referring now to FIG. 2A, detector elements 29a–c and 29e–g are preferably split into two detector segments each in a horizontal direction. The split direction is parallel to the orientation of the track image on the detectors. In this case, detector elements 29a–c and 29e–g are split horizontally since the tracks are oriented horizontally. This direction can be used with the double-knife focusing method or when the detectors serve only data channels and the focusing channel is separated from the data channel. Detector element 29a is split into detector segments Ja and Jb, detector element 29b is split into detector segments Ha and Hb, detector element 29c is split into detector segments Fa and Fb, detector element 29e is split into detector segments Ea and Eb, detector element 29f is split into detector segments Ga and Gb, and detector element 29g is split into detector segments Ia and Ib. Each one of detector segments Ja and Jb, Ha and Hb, Fa and Fb, Ea and Eb, Ga and Gb, and Ia and Ib are also separated by distance t.

These segments are used to generate a signal indicative of variations in track offset that result in cross-talk and jitter in optical disks. When the multiple reading beams are correctly aligned with their respective tracks, there are no track pitch variations or track offsets. The multiple reading beams are reflected off the optical disk so that they illuminate each of detector elements 29a–g such that each segment in a given pair of segments Ja and Jb, Ha and Hb, Fa and Fb, Ea and Eb, Ga and Gb, and Ia and Ib is illuminated equally. Conversely, when there is track offset, the detector segments Ja and Jb, Ha and Hb, Fa and Fb, Ea and Eb, Ga and Gb, and Ia and Ib are illuminated with different laser intensities. For example, segment Ia may receive more illumination than segment Ib. As described below, the difference in illumination can be used to determine and correct for jitter and cross-talk.

Referring now to FIG. 2B, detector elements 31a–c and 31e–g are preferably split into two detector segments each in a perpendicular direction, i.e., tangential along a track. This perpendicular split is used when the detector elements 31a–g are coincided with the focusing detectors and the focus is astigmatic. It should be understood by one skilled in the art that if the detector elements are coincided with the focusing detectors and the imaging system has an astigmatic element oriented by an angle $\alpha$ to the tracks, the split direction is rotated by an angle $2\alpha$ to the track orientation. In the case of detector elements 31a–c and 31e–g, the astigmatic element is rotated by 45° to the tracks and the track image is rotated by 90°, resulting in a perpendicular split. Since the angle $\alpha$ may assume other values, multi-element photodetectors constructed in accordance with the principles of the present invention may have diagonally split detector elements.

Detector element 31a is split into detector segments Ja and Jb, detector element 31b is split into detector segments Ha and Hb, detector element 31c is split into detector segments Fa and Fb, detector element 31e is split into detector segments Ea and Eb, detector element 31f is split into detector segments Ga and Gb, and detector element 31g is split into detector segments Ia and Ib. Each one of detector segments Ja and Jb, Ha and Hb, Fa and Fb, Ea and Eb, Ga and Gb, and Ia and Ib are also separated by distance t.

Analogously to the detector of FIG. 2A, the segments generate signals indicative of variations in track offset that result in cross-talk and jitter in optical disks. When the multiple reading beams are correctly aligned with their respective tracks, there are no track pitch variations or track offsets. The multiple reading beams are reflected off the optical disk so that they illuminate each of detector elements 31a–g such that each segment in a given pair of segments Ja and Jb, Ha and Hb, Fa and Fb, Ea and Eb, Ga and Gb, and Ia and Ib is illuminated equally. Conversely, when there is track offset, the detector segments Ja and Jb, Ha and Hb, Fa and Fb, Ea and Eb, Ga and Gb, and Ia and Ib are illuminated with different laser intensities. The difference in illumination is used to detect and correct for cross-talk and jitter.

Referring now to FIG. 2C, multi-element detector 32 has split detectors 33a–g that are vertically rotated. In contrast to detectors 28 (FIG. 2A) and 30 (FIG. 2B), detector 32 has detector elements that are not staggered. Detector elements 33a–c and 33e–g are split in a perpendicular direction and coincide with the focusing detectors.

It should be understood by one skilled in the art that detector elements 28 (FIG. 2A), 30 (FIG. 2B), and 32 (FIG. 2C) are shown for the purposes of illustration only. Other detector configurations may be constructed in accordance with the principles of the present invention. In particular, the detector elements may be split horizontally, vertically, or diagonally, with each side detector elements split into two or more detector segments.

Figure 3A:
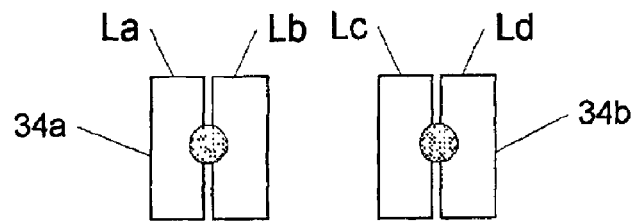
FIGS. 3A and 3B are illustrative views of a laser beam illuminating two split detectors for different focusing arrangements when there is no track offset.
Figure 3A:
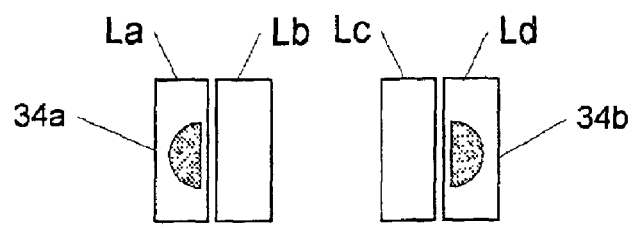
Figure 3A:
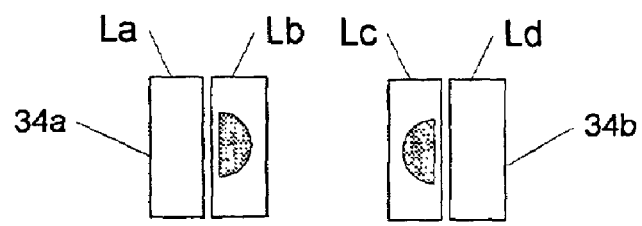
Figure 3B:
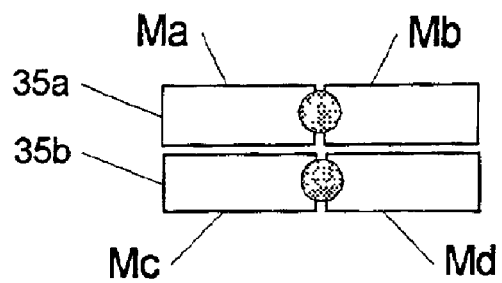
Figure 3B:
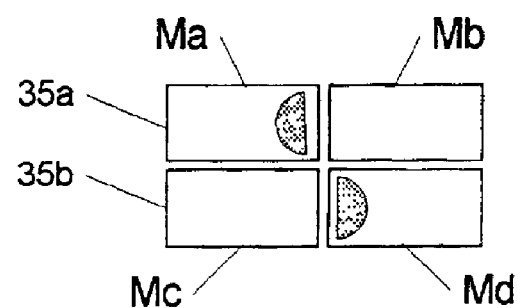
Figure 3B:
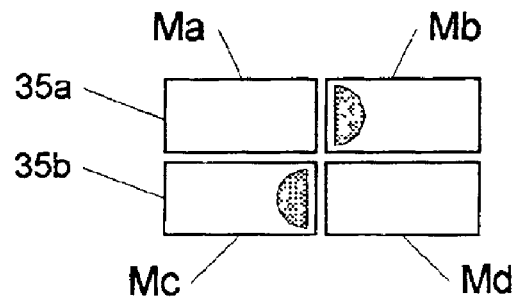

Referring now to FIGS. 3A and 3B, illustrative views of a laser beam illuminating two split detectors for different focusing arrangements when there is no track offset is described. Split detectors 32a–b in FIG. 3A and split detectors 33a–b in FIG. 3B are split in the vertical direction into two detector segments each. Split detectors 32a–b in FIG. 3A are arranged side by side, while split detectors 33a–b in FIG. 3B are arranged so that one split detector is on top of the other. Both arrangements may be used with the double-knife edge focusing method.

Referring now to FIG. 3A, split detectors 32a–b are illuminated by a laser beam according to the position of the disk relative to the objective lens. Each split detector is illuminated by a laser beam that has been focused by a knife edge or a holographic focusing element. Split detector 32a comprises detector segment La and detector segment Lb, and split detector 32b comprises detector segment Lc and detector segment Ld. The focusing error signal is calculated as (La+Lc)−(Lb+Ld). When the multi-beam optical pickup system is properly aligned, the focusing element sends each half of the laser beam illuminating split detector 32a to one of its detector segments La and Lb and each half of the laser beam illuminating split detector 32b to one of its detector segments Lc and Ld.

When the double-knife edge focusing is used, the laser beam may be divided into three parts. One half of the beam is used for focusing, and the other half of the beam is divided into two parts that are used for generating a tracking error signal. In each case, all the relevant parts of the laser beam are used for obtaining the desired signals. The half of the laser beam that illuminates the split detector is then focused on one of the detector segments. When the disk is close to the objective lens, the half of the laser beam illuminating split detector 32a is focused on detector segment La, and the half of the laser beam illuminating split detector 32b is focused on detector segment Ld. When the disk is far from the objective lens, the half of the laser beam illuminating split detector 32a is focused on detector segment Lb, and the half of the laser beam illuminating split detector 32b is focused on detector segment Lc.

Referring now to FIG. 3B, split detectors 33a–b are illuminated by a laser beam according to the position of the disk relative to the objective lens. Each split detector is illuminated by a laser beam that has been focused by a knife edge or a holographic focusing element. Split detector 33a comprises detector segment Ma and detector segment Mb, and split detector 33b comprises detector segment Mc and detector segment Md. The focusing error signal is calculated as (Ma+Mc)−(Mb+Md). When the multi-beam optical pickup system is properly aligned, the focusing element sends each half of the laser beam illuminating split detector 33a to one of its detector segments Ma and Mb and each half of the laser beam illuminating split detector 33b to one of its detector segments Mc and Md.

When the double-knife edge focusing is used, the laser beam may be divided into three parts. One half of the beam is used for focusing, and the other half of the beam is divided into two parts that are used for generating a tracking error signal. In each case, all the relevant parts of the laser beam are used for obtaining the desired signals. The half of the laser beam that illuminates the split detector is then focused on one of the detector segments. When the disk is close to the objective lens, the half of the laser beam illuminating split detector 33a is focused on detector segment Ma, and the half of the laser beam illuminating split detector 33b is focused on detector segment Md. When the disk is far from the objective lens, the half of the laser beam illuminating split detector 33a is focused on detector segment Mb, and the half of the laser beam illuminating split detector 33b is focused on detector segment Mc.

Figure 4:
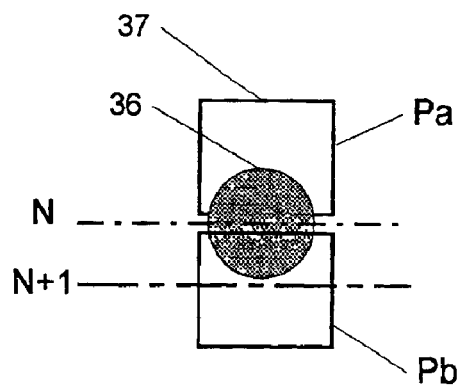
FIG. 4 is an illustrative view of a laser beam illuminating a horizontally split detector when there is no track offset.

Referring now to FIG. 4, an illustrative view of a laser beam illuminating a split detector when there is no track offset is described. Laser beam 34 is reflected from an optical disk and illuminates both detector segments Pa and Pb of split detector 35 equally. Because laser beam 34 is centered on track N, segments Pa and Pb of split detector 35 are illuminated equally. Track N+1, however, generates a weak signal in detector segment Pb and a very weak signal in detector segment Pa. The effect of track N+1 is so small that it may be ignored.

Detector 35 therefore provides a signal S corresponding to the data in track N such that $S=S_A+S_B$, where $S_A$ is the signal in detector segment Pa, and $S_B$ is the signal in detector segment Pb. Because the multi-beam optical pickup system is aligned and there is no track offset, signals $S_A$ and $S_B$ are each equal to approximately half of signal S.

Figure 5A:
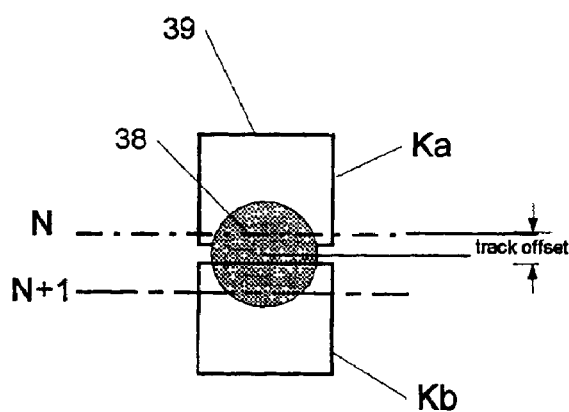
FIGS. 5A and 5B are illustrative views of a laser beam illuminating a split detector when there is track offset.
Figure 5B:
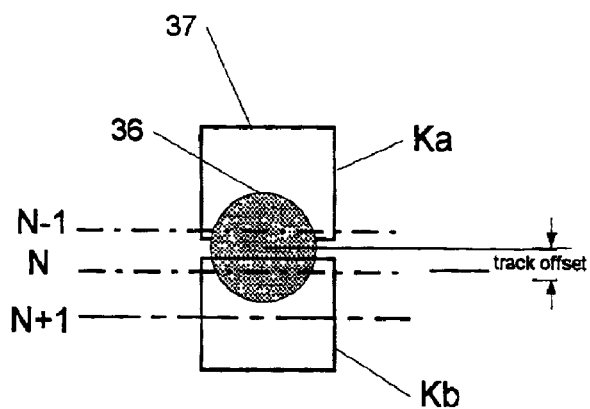

Referring now to FIGS. 5A and 5B, illustrative views of a laser beam illuminating a split detector when there is track offset are described. Laser beam 36 illuminates detector elements Ka and Kb of split detector 37 to read track N. As the multi-beam optical system is aligned, laser beam 36 illuminates both detector elements Ka and Kb equally. Referring to FIG. 5A, due to a track offset between laser beam 36 and track N, laser beam 36 is also reflected from track N+1, and the reflected laser beam is modulated by both tracks N and N+1. Because laser beam 36 is now closer to track N+1, its effect on track N+1 is now much stronger than in FIG. 4, resulting in cross-talk. Detector segment Ka has less cross-talk than detector segment Kb, and signal $S_A$ read in detector segment A has much lower jitter than signal $S_B$ read in detector segment B. Instead of reading the signal S from track N as $S=S_A+S_B$ as in FIG. 4, signal S is now read as $S=S_A$ so that cross-talk and jitter are reduced. Since less of signal S is used, a lower signal amplitude is processed. If desired, a preamplifier can be used before processing or the power of the beam can be increased.

Referring now to FIG. 5B, when the track offset changes sign such that detector segment Ka is disturbed more by a signal read from track N−1, detector segment Kb now has less cross-talk than detector segment Ka, and signal $S_B$ read in detector segment Kb has much lower jitter than the signal $S_A$ read in detector segment Ka. Instead of reading the signal S from track N as $S=S_A+S_B$ as in FIG. 4, signal S is now read as $S=S_B$ so that cross-talk and jitter are reduced. Since less of signal S is used, a lower signal amplitude is processed. If desired, a preamplifier can be used before processing or the power of the beam can be increased. To determine whether S should be read as $S=S_A$ or as $S=S_B$ the signal $S_A-S_B$ can be computed to define the sign and the value of the track offset.

Figure 6:
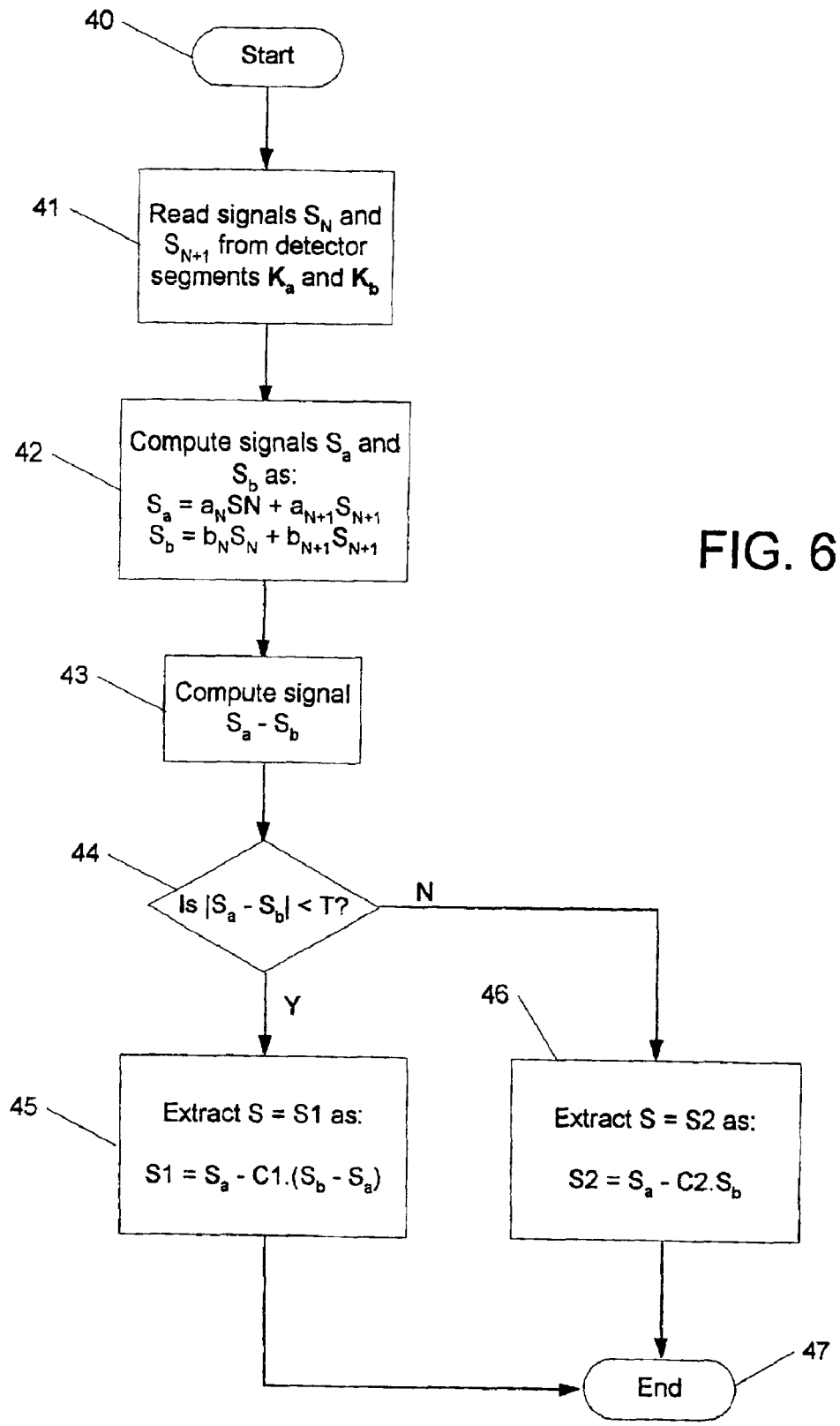
FIG. 6 is a flowchart for generating a signal with less cross-talk in the presence of a track offset.

Referring now to FIG. 6, a flowchart for using the signals read in both halves of a split detector to generate a signal with less cross-talk when there is a track offset is described. At step 39, signals $S_N$ and $S_{N+1}$ are read in detector segments Ka and Kb. Signals $S_N$ and $S_{N+1}$ are the signals read from tracks N and N+1, respectively, by a laser beam considering the contributions of both detector segments Ka and Kb. Next, at step 40, the signals $S_A$ and $S_B$ for detector segments Ka and Kb are formed as approximately linear combinations of the signals $S_N$ and $S_{N+1}$. The weights $a_N$, $a_{N+1}$, $b_N$, and $b_{N+1}$, are the weights of the signals $S_N$ and $S_{N+1}$ to form signals $S_A$ and $S_B$, and are determined experimentally or in theoretical simulation.

At step 41, the signal $S_A-S_B$ is computed to determine the value and the sign of the track offset. If the track offset is smaller than a threshold T (step 42), then the signal S read from track N is extracted at step 43 as S=S1 by using cross-talk cancellation algorithm 1. Otherwise, if the value of track offset is bigger than or equal to the threshold T, then the signal S read from track N is extracted at step 44 as S=S2 by using cross-talk cancellation algorithm 2. Both cross-talk cancellation algorithms 1 and 2 reduce the cross-talk for the signal read from track N, but result in different signal amplitudes. The threshold T is determined as a percentage of the track pitch. For a DVD, the threshold T was determined by simulation to be 29% of the track pitch.

Referring now to FIG. 7, a table of percentages of jitter versus track offset determined by simulation is described. Table 46 shows that using split detectors or cross-cancellation algorithms separately reduces the jitter considerably. When both split detectors and cross-cancellation algorithms are employed, the jitter is reduced substantially more than a multi-beam optical system that does not use split detectors or cross-talk cancellation algorithms, or a multi-beam optical system that uses either one individually.

Referring now to FIG. 8, a table of cross-talk cancellation coefficients versus track offset determined by simulation is described. Table 47 shows the values of cross-talk coefficients C1 and C2 for different track offset values. The track offset values in table 50 are given as percentages of the track pitch. When the track offset is equal to the threshold T of 29% of the track pitch, cross-talk coefficients C1 and C2 have the same magnitude but opposing signs, indicating that the signal S can be extracted either as S=S1 by using algorithm 1 or as S=S2 by using algorithm 2.

Referring now to FIG. 9, a table of RMS ratios versus track offset determined by simulation of two different cross-talk cancellation algorithms is described. The RMS ratio is the ratio of the RMS of the signal S after a cross-talk cancellation algorithm has been applied to the RMS of the signal before the cross-talk cancellation algorithm has been applied. Table 48 indicates which RMS ratios indicate which cross-talk algorithm is better for different values of track offsets. Table 48 shows that cross-talk algorithm 2 results in a lower RMS ratio when the track offset is below the threshold T of 29%, resulting in significantly larger signal amplitudes than cross-talk cancellation algorithm 1. When the track offset is above the threshold T of 29%, cross-talk cancellation algorithm 1 is preferred to cross-talk cancellation algorithm 2. It should be understood by one skilled in the art that when there is no track-offset, cross-talk cancellation algorithm 2 is used and the signal S is extracted from the full detector as $S=S_A+S_B$, with $S_A=S_B$.

The present invention preferably provides the disclosed methods as a microcontroller or microprocessor under software control. However, the present invention contemplates that any of those methods may be done entirely in hardware, such as a state machine, or in a combination of hardware and software control. Thus, the methods described in FIG. 6 for cross-talk cancellation may be performed by a cross-talk cancellation apparatus that is entirely hardware, software-controlled hardware, or a combination of those.

The present invention is preferably incorporated into an optical disk drive. A disk drive is a machine that reads data from, and may write data onto, a disk. A disk drive rotates the disk and has one or more heads that read and may write data. One example of a disk drive is an optical drive that reads optical disks. The disk drive further has electronics and mechanisms that control the heads and that process the read data. The processed data can then be used, for example, by a computer. The disk drive can be either internal (housed within the computer) or external.

Although particular embodiments of the present invention have been described above in detail, it will be understood that this description is merely for purposes of illustration. Specific features of the invention are shown in some drawings and not in others, and this is for convenience only. Steps of the described systems and methods may be reordered or combined, and other steps may be included. Further variations will be apparent to one skilled in the art in light of this disclosure and are intended to fall within the scope of the appended claims.

What is claimed is:

1. Apparatus for simultaneously reading multiple adjacent tracks of an optical disk, the apparatus comprising:
   optical devices for generating a plurality of reading beams including a center beam;
   an optical system disposed in a path of the plurality of reading beams, the optical system directing the plurality of reading beams onto a surface of the optical disk;
   a plurality of split photodetector elements including a center element and a plurality of side elements, the center element generating an output signal corresponding to the center beam, at least one of the plurality of side elements generating an output signal for a corresponding one of the plurality of reading beams; and
   a cross-talk cancellation apparatus that determines the track offset of the optical disk, that verifies if the track offset is below or above a threshold value, wherein the threshold value is a function of the track pitch of the optical disk, and that applies cross-talk cancellation to correct cross-talk and jitter for the output signal of at least one of the side elements according to the track offset.

2. The apparatus of claim 1, wherein the center element is a quadrant detector.

3. The apparatus of claim 1, wherein the plurality of side elements comprise a plurality of split photodetectors, each split photodetector divided into a first and a second photodetector segment in a radial direction.

4. The apparatus of claim 3, wherein the first and the second photodetector segment are divided into the perpendicular direction when astigmatic focus is used in the optical system.

5. The apparatus of claim 1, wherein the side elements are each divided into a first and a second photodetector segment, and wherein applying cross-talk cancellation according to the track pitch comprises forming a first and a second weighted sum of the output signal for a first track of the optical disk and an output signal generated for an adjacent second track of the optical disk, the first weighted sum corresponding to the first segment of the side element and the second weighted sum corresponding to the second segment of the side element.

6. The apparatus of claim 5, wherein weights used in computing the first and the second weighted sums are determined experimentally and through simulation.

7. The apparatus of claim 5, wherein applying cross-talk cancellation according to the track pitch comprises generating a signal as a weighted combination of the first and the second weighted sums.

8. The apparatus of claim 7, wherein weights used in the weighted combination are functions of the track offset.

9. The apparatus of claim 1, wherein the apparatus is incorporated into a disk drive.

10. A method for simultaneously reading multiple data tracks from an optical disk, the method comprising:

receiving a plurality of reading beams including a center beam;

providing a plurality of split photodetector elements including a center element and a plurality of side elements, the center element generating an output signal corresponding to the center beam, at least one of the plurality of side elements generating an output signal for a corresponding one of the plurality of reading beams;

correcting cross-talk and jitter caused by a track offset in the optical disk for the output signal for the at least one of the plurality of side elements, comprising:

measuring the track offset of the optical disk;

verifying if the track offset is below or above a threshold value; and applying cross-talk cancellation for the output signal of at least one of the side elements according to the track offset.

11. The method of claim 10, wherein the center element is a quadrant detector.

12. The method of claim 10, wherein the plurality of side elements comprise a plurality of split photodetectors, each split photodetector divide into a first and a second photodetector segment.

13. The method of claim 12, wherein the first and the second photodetector segment are divided into the perpendicular direction when astigmatic focus is used in the optical system.

14. The method of claim 10, wherein the threshold value is a function of the track pitch of the optical disk.

15. The method of claim 10, wherein applying cross-talk cancellation according to the track pitch comprises forming a first and a second weighted sum of the output signal for a first track of the optical disk and output signal generated for an adjacent second track of the optical disk, the first weighted sum corresponding to the first segment of the side element and the second weighted sum corresponding to the second segment of the side element.

16. The method of claim 15, wherein weight used in computing the first and the second weighted sums are determined experimentally and through simulation.

17. The method of claim 15, wherein applying cross-talk cancellation according to the track pitch comprises generating a signal as a weighted combination of the first and the second weighted sums.

18. The method of claim 17, wherein weight used in the weighted combination are functions of the track offset.

19. A detector for a multi-beam optical disk system, the detector comprising a plurality of split photodetector elements including a center detector element and a plurality of side elements, at least two of the side elements divided into a first and a second photodetector segment, the split photodetector elements used to reduce cross-talk in the multi-beam optical disk, by:

determining the track offset of an optical disk read by the optical disk system;

verifying if the track offset is below or above a threshold value; and applying cross-talk cancellation to correct cross-talk an jitter for the output signal of at least one of the side elements according to the track offset.

20. The detector of claim 19, wherein each side element is divided into a first and a second photodetector segment in the radial direction.

21. The detector of claim 19, wherein each side element is divided into a first and a second photodetector segment in the perpendicular direction when astigmatic focus is used in the optical disk system.

22. The detector of claim 19, wherein the detector is incorporated into a disk drive.

23. The method of claim 19, wherein the threshold value is a function of the track pitch of the optical disk.

24. The method of claim 23, wherein applying cross-talk cancellation according to the track pitch comprises forming a first and a second weighted sum of the output signal for a first track of the optical disk and an output signal generated for an adjacent second track of the optical disk, the first weighted sum corresponding to the first photodetector segment of the side element and the second weighted sum corresponding to the second photodetector segment of the side element.

25. The method of claim 24, wherein weight used in computing the first and the second weighted sums are determined experimentally and through simulation.

26. The method of claim 24, wherein applying cross-talk cancellation according to the track pitch comprises generating a signal as a weighted combination of the first and the second weighted sums.

27. The method of claim 26, wherein weight used in the weighted combination are functions of the track offset.

28. A method for simultaneously reading multiple data tracks from an optical disk, the method comprising:

receiving a plurality of reading beams including a center beam;

providing a plurality of split photodetector elements including a center element and a plurality of side elements, the center element generating an output signal corresponding to the center beam, at least one of the plurality of side elements generating output signal for a corresponding one of the plurality of reading beams;

measuring the track offset of the optical disk;

verifying if the track offset is below or above a threshold value;

applying a first cross-talk cancellation algorithm to correct cross-talk and jitter for the output signal of at least one of the side elements if the track offset is smaller than the threshold; and applying a second cross-talk cancellation algorithm to correct cross-talk and jitter for the output signal of at least one of the side elements if the track offset is equal to or bigger than the threshold.

29. The method of claim 28, wherein the center element is a quadrant detector.

30. The method of claim 28, wherein the plurality of side elements comprise a plurality of split photodetectors, each split photodetector divided into a first and a second photodetector segment.

31. The method of claim 30, wherein the first and the second photodetector segment are divided into the perpendicular direction when astigmatic focus is used in the optical system.

32. The method of claim 28, wherein applying a first cross-talk cancellation algorithm and applying a second cross-talk cancellation algorithm comprise forming a first and a second weighted sum of the output signal for a first track of the optical disk and an output signal generated for an adjacent second track of the optical disk, the first weighted sum corresponding to the first segment of the side element and the second weighted sum corresponding to the second segment of the side element.

33. The method of claim 32, wherein weight used in computing the first and the second weighted sums are determined experimentally and through simulation.

34. The method of claim 28, wherein applying a first cross-talk cancellation algorithm comprises generating a signal as a weighted combination of the first and second weighted sums.

35. The method of claim 28, wherein applying the second cross-talk cancellation algorithm comprises generating a signal as a weighted combination of the first and second weighted sums.

36. Apparatus for simultaneously reading multiple adjacent tracks of an optical disk, the apparatus comprising:

optical devices for generating a plurality of reading beams;

an optical system disposed in a path of the plurality of reading beams, the optical system directing the plurality of reading beams onto a surface of the optical disk;

a plurality of split photodetector elements, at least one of the plurality of photodetector elements generating an output signal for a corresponding one of the plurality of reading beams; and a cross-talk cancellation apparatus that determines the track offset of the optical disk, that verifies if the track offset is below or above a threshold value, and that applies cross-talk cancellation to correct cross-talk and jitter for the output signal of at least one of the photodetector elements according to the track offset.

37. The apparatus of claim 36, wherein the plurality of split photodetector elements includes a center element that is a quadrant detector.

38. The apparatus of claim 36, wherein the plurality of split photodetector elements includes a plurality of side elements, each side element divided into a first and a second photodetector segment in a radial direction.

39. The apparatus of claim 38, wherein the first and the second photodetector segment are divided into the perpendicular direction when astigmatic focus is used in the optical system.

* * * * *

UNITED STATES PATENT AND TRADEMARK OFFICE
CERTIFICATE OF CORRECTION

PATENT NO. : 6,940,805 B2
DATED : September 6, 2005
INVENTOR(S) : Koby Finkelstein et al.

It is certified that error appears in the above-identified patent and that said Letters Patent is hereby corrected as shown below:

Column 11,
Line 62, delete "divide" and insert -- divided --.

Column 12,
Line 6, after "and" insert -- an --.
Lines 11, 17, 53 and 60, delete "weight" and insert -- weights --.
Line 30, delete "an" and insert -- and --.

Column 13,
Line 3, after "generating" insert -- an --.
Line 36, delete "weight" and insert -- weights --.

Signed and Sealed this

Eleventh Day of April, 2006

JON W. DUDAS
*Director of the United States Patent and Trademark Office*